United States Patent Office 3,240,744
Patented Mar. 15, 1966

3,240,744
USE OF FUSION AIDS IN FLUIDIZED BED
COATING TECHNIQUES
Raymond V. Kusiak, Springfield Township, Montgomery
County, Pa., assignor to Pennsalt Chemicals Corporation, Philadelphia, Pa., a corporation of Pennsylvania
No Drawing. Filed Oct. 19, 1961, Ser. No. 146,348
6 Claims. (Cl. 260—31.8)

This invention deals with a new, improved fluidized bed coating material and coating technique as applied to resins having a high melt viscosity, and particularly relates to fluorocarbon resins.

Fluidized bed coating processes are well known in the coating industry. U.S. 2,844,489, for example, thoroughly discusses the process pointing out that the coating material, preferably in the form of pulverulent granules, is transformed into a continuously fluidized bed, by introducing at least one curent of gas under pressure therein, the bed being maintained in the fluidized state by controlling the flow of gas. The articles to be coated is at least partially immersed into the fluidized bed of the coating material while the article is hot; that is, the article is at a temperature above the melting or sintering point of the coating material. Individual particles of the coating material adhere and melt and fuse together with other particles on the hot surface of the immersed portion of the article to form a continuous coating thereon. The process has particular advantage in that it eliminates the use of liquid solvents as dispersing agents for the coating material. It is relatively simple and enables very complex shapes to be coated readily.

Numerous resinous materials have been used in the fluidized bed technique to coat various substrates. Thus, for example, epoxy resins, vinyl materials, polyethylene, polyamides such as nylon, chlorinated polyethers, polystyrenes, acrylic resins, cellulosics, fluorocarbon resins, and the like, have all been used in fluid bed coating techniques. The fluorocarbon resins are of particular value where chemical and thermal resistant coatings are desired, since these materials have inherent high temperature stability and excellent anti-corrosion properties. However, where anti-corrosion coatings are required, it is essential that the coating be continuous and free of any breaks or pinholes. Unfortunately, when the fluorocarbon resins are to be used in fluidized bed techniques the coating obtained is frequently not satisfactory in that it contains numerous pinholes. Such pinholes are, of course, points of attack for corrosive chemicals and make the coated surface valueless in their intended use. These pinholes appear to result from the fact that fluorocarbon resins hav a high melt viscosity at processing temperatures and therefore do not lend themselves to the formation of smooth continuous coatings under the temperature conditions usually employed.

It has now been found by means of this invention that continuous, pinhole-free coatings can be obtained with high melt viscosity materials using fluidized bed coating techniques. This invention comprises the dispersion of a fusion aid into the coating material and in this way melt flow is very greatly increased over that obtained without the fusion aid. Thus, continuous pinhole-free coatings are readily and easily obtained.

The fusion aids useful in the invention will be thermally stable, essentially nonvolatile materials selected from the class of neutral polyesters. Such polyesters will be obtained by the condensation polymerization of an aliphatic diol with an aromatic or aliphatic dibasic acid and in order to obtain a neutral polyester product, the stoichiometric amount of diol used will be in excess so that the end groups of the polymer obtained are hydroxyl terminated. In lieu of using the diol in stoichiometric excess, an aliphatic mono-alcohol may be included with the diol and dibasic acid to termiante the end groups as an ester. Thus, the polyester fusion aid will be terminated from a group selected from the class consisting of hydroxy and ester groups. These polyesters will normally have a molecular weight from about 1000 to about 3000 and will be thermally stable for several minutes up to at least about 400° C. As indicated, their volatility will be low since they will exhibit a minimum boiling point of about 400° C. Examples of diols used to form such esters are neopentyl glycol, ethylene glycol, propylene glycol, the butane diols, 1,3-propane diol, diethylene glycol, triethylene glycol, etc. Aliphatic dibasic acids that will be employed include malonic, succinic, glutaric, adipic, sebacic, azelaic, phthalic, terephthalic, and the like. The preferred fusion aid will be obtained from the aliphatic dibasic acids (e.g., adipic) and a four to six carbon glycol (e.g., neopentyl glycol).

The techniques and procedures used in the process of this invention will be consistent with the usual procedures used in fluidized bed coating processes. The only additional step required is the incorporation of the fusion aid with the coating resin prior to fluidization. This blending of fusion aid and resin may be done in any one of several ways, either by a dry or wet blending technique. For dry blending, resin and fusion aid are simply mixed in a conventional type blender, such as a patterson-Kelly, ribbon or sigma blade blender, until a thorough mixture is obtained. In the wet blending technique, the fusion aid is first dissolved in a volatile low boiling solvent whose boiling point is below the softening point of the resin and which exhibits solvation for the fusion aid, but not for the resin. Examples of such solvents are the aromatic hydrocarbon solvents such as benzene, toluene, xylene, etc. This solution is then added to the resin with continuous agitation. When dispersion is complete, the solvent is volatilized off leaving the blended mixture which is further ground to the desired particle size. The preferred technique, because of simplicity and cost is the dry blending procedure, but the wet blending method gives a somewhat better dispersion.

As is known in this art, the particle size of the coating resin is important to obtain satisfactory fluidized beds and the particular particle size required will vary with each coating resin. In the case of polyvinylidene fluoride, the resin is ground by conventional techniques (e.g., a hammer mill) to the desired particle size distribution. The minimum particle size distribution for polyvinylidene fluoride resin is that which permits 75% or more of the polymer to pass through a 325-mesh screen. The maximum particle size which can be tolerated for polyvinylidene fluoride is that which has a distribution of at least 85% between 60 and 140 mesh. The preferred particle size distribution is that in which the resin has a rather uniform particle size distribution of approximately 60% between 60 and 140 mesh with the remainder being distributed uniformly between 140 and 325 mesh. Other resins will have similar particle size distribution requirements, it being understood that the smaller the particle size the quicker the coalescence of particles to give a thicker coating in a given time. Conversely, coarser particles give a thinner coating than finer particles in a given time.

It is also important, as known in the art, that the maximum allowable moisture content of the resin for good fluidization be no more than about 0.5%, and resins having a moisture content of about 0.5% to 0.1% will usually be used. As the moisture content of the granular particles is reduced, the coatings obtained are smoother and the fluidized bed itself is more uniform without undesirable bubbling. When the moisture content exceeds about 0.5% an extremely caky powder is obtained which yields a fluidized bed with much bubbling.

The amount of fusion aid used in the resin powder will usually be between about 5 parts and about 45 parts by weight per 100 parts of coating resin. Use of this amount not only results in obtaining a pinhole-free continuous coating, but it reduces the processing temperatures considerably and also yields an improved fluidized bed. It is preferred to have from about 10 to 30 parts of fusion aid per hundred parts of coating resin present in the polymer.

As indicated, the fusion aid used in the process of this invention will be a nonvolatile polyester as described above, and this is essential to the process. However, because the fusion aid is nonvolatile it remains in the final coating. Because of its high thermal stability, it does not significantly affect thermal properties of the finished coating, but in order to maintain as closely as possible the thermal and chemical resistance properties of the coating resin, it is desirable to keep to a minimum the amount of nonvolatile fusion aid. In those instances where a rather high proportion of fusion aid must be used to achieve adequate melt-flow character, it is often desirable to reduce the amount of nonvolatile fusion aid by using a volatile fusion aid in conjunction with it. The total amount of fusion aid of 5 to 45 parts per 100 parts of resin will be maintained, but of this amount 5% to 95% of the total may be a volatile fusion aid. The volatile fusion aids are characterized as those substances having a boiling point between about 200° and 300° C. and which at these temperatures have some solvating effect on the coating resin to be applied. At room temperatures, of course, the volatile fusion aids will be completely inert with respect to the coating resin. These materials are generally selected from the class of esters, ethers, and glycols and are exemplified by such compounds as dimethyl phthalate, propylene carbonate, tricresyl phosphate, ethoxydiglycol acetate ($CH_3COO[C_2H_4O]_2C_2H_5$), butoxydiglycol acetate ($CH_3COO[C_2H_4O]_2C_4H_9$), methoxytriglycol acetate, diethyl succinate, the dibutyl ether of ethylene glycol, the dibutyl ether of diethylene glycol, diethylene glycol, triethylene glycol, dipropylene glycol, 2-ethyl-1,3-hexanediol, and the like. Incorporation of these volatile fusion aids in the coating resin will be accomplished by either the wet or dry blending techniques referred to above.

It will be understood that this invention may be applied to any resin to be coated by fluidized bed techniques which has a high melt velocity (i.e., above about 1 megapoise) and the invention is particularly useful with fluorocarbon resins such as polytetrafluoroethylene (melt viscosity above 10,000 megapoise), polyvinylidene fluoride (melt viscosity above 1 megapoise) and polychlorotrifluoroethylene (melt viscosity above 20 megapoise). Also applicable to the process of this invention are the copolymers of perfluoroethylene, perfluoropropylene, and the like. The following examples will illustrate the invention as applied to polyvinylidene fluoride:

*Example 1*

A previously degreased and sandblasted substrate (a steel panel 3" x 1.5" x 0.255") was preheated for 20 minutes at 350° C. It was then immersed for 20 seconds into a fluidized bed containing vinylidene fluoride polymer which did not contain any fusion aid. The polymer had a melt index flow of 4 grams per 10 minutes as carried out by the test method ASTM D 1238–57T Condition J. Particle size distribution of the resin was approximately 60% between 60 and 140 mesh and it contained less than 0.05% moisture. The coated panel, which had a sugar coated appearance, was then placed into an oven at 350° C. for 45 minutes to fuse the clinging particles into a coating.

The resulting coating had a rough, and noncoherent appearance predominantly covered with a grainy glassy covering. It was not completely fused into a continuous coating.

*Example 2*

A previously degreased and sandblasted steel panel substrate (3" x 1.5" x 0.225") was preheated for 20 minutes at 225° C. It was then immersed for 20 seconds into a fluidized bed containing vinylidene fluoride polymer formulated with 30 p.h.r. (parts per 100 parts of resin) of an alcohol terminated polyester of neopentyl glycol and adipic acid having a molecular weight range of 1100 to 1400. The melt index flow of the polymer plus fusion aid was 70 g. per 10 min. The mixture had a particle size distribution of approximately 60% between 60 and 140 mesh, and contained less than 0.05% moisture. The coated panel, which had a sugar coated appearance, was then subjected to a fusion temperature of 325° C. for 7 minutes to fuse the clinging particles into a coating about 12 to 15 mils thick.

The resulting coating was smooth, continuous, clear, and completely fused. To determine the presence of pinholes the coated panel was evaluated with a megometer for electrical insulation resistance and extremely high resistance indicated its freedom from pinholes. This test is carried out as follows: One lead from a megometer is attached to the base metal of the coated article, the coated portion of which is immersed in a sodium chloride solution. The second lead from the megometer is connected to a metal rod in the salt solution to serve as the second electrode. A voltage of 50 volts is applied from the megometer and the resistance observed. A pinhole-free coating is indicated when the resistance observed exceeds one million ohms.

*Example 3*

A previously degreased and sandblasted steel panel was preheated for 20 minutes at 325° C. It was then immersed for 15 seconds into a fluidized bed containing vinylidene fluoride polymer formulated with 20 parts per hundred of fusion aids which consisted of 10 parts per hundred parts of resin of dimethylphthalate as a volatile fusion aid and as nonvolatile fusion aid 10 p.h.r. of an alchol terminated polyester of neopentyl glycol and adipic acid having a molecular weight of approximately 2500. The coating material had a melt flow of 25 g./10 minutes. Its particle size distribution was approximately 60% between 60 and 140 mesh and it contained less than 0.05% moisture. The coated panel which had a sugar coated appearance was then subjected to a fusion temperature of 325° C. for 18 minutes to fuse the clinging particles into a coating.

The resulting coating was smooth, continuous, and free of any pinholes. The coating was clear and completely fused.

*Example 4*

A previously degreased and sandblasted steel panel is preheated for 20 minutes at 225° C. and then immersed for 20 seconds into a fluidized bed containing vinylidene fluoride polymer formulated with 30 p.h.r. of the fusion aid used in Example 2, but having a particle size of which 75% or more will pass through a 325-mesh screen. The coated article is then fused as in Example 2, and the resulting coating is essentially the same as in Example 2, but is 20 mils thick.

*Example 5*

A previously degreased and sandblasted steel panel substrate is preheated for 20 minutes at 225° C. It is then immersed for 20 seconds into a fluidized bed containing vinylidene fluoride polymer formulated with 30 p.h.r. of the fusion aid of Example 2. The coating material has a particle size in which 85% of the material passes through a 60-mesh screen, but not through a 140-mesh screen. The coated article is fused as in Example 2, and the resulting coating is essentially the same as in Example 2, but is about 7 to 10 mils thick.

I claim:

1. In the process of coating surfaces by the fluidized bed technique wherein the coating material is a polyvinylidene fluoride resin having a melt viscosity greater than 1 megapoise, the improvement which consists of dispersing in said coating material between about 5 and about 45 parts by weight per 100 parts of said coating material of a neutral polyester terminated with a group selected from the class consisting of hydroxyl and ester groups and having a molecular weight between about 1000 and about 3000 obtained by the condensation polymerization of an aliphatic diol with an aliphatic dibasic acid whereby continuous pinhole-free coatings are obtained in the fluidized bed coating procedure.

2. In the process of coating surfaces by the fluidized bed technique wherein the coating material is polyvinylidene fluoride and has a melt viscosity greater than 1 megapoise, the improvement which consists of dispersing in said coating material between about 5 and about 45 parts by weight per 100 parts of said coating material of a fusion aid, said fusion aid comprising (a) a thermally stable neutral polyester having a molecular weight between about 1000 and 3000 and having end groups selected from the class consisting of hydroxyl and ester groups and which is nonvolatile at the coating temperature and (b) from about 5% to 95% by weight of the total fusion aid of a substance having a solvating effect on said coating material and boiling at atmospheric pressure at about 200° C. to 300° C.

3. In the process of coating surfaces with polyvinylidene fluoride by the fluidized bed technique, the improvement which consists of dispersing in said polyvinylidene fluoride as a fusion aid from about 10 to about 30 parts per 100 parts of polyvinylidene fluoride of a neutral polyester having end groups selected from the class consisting of hydroxyl and ester groups and having a molecular weight between about 1000 and about 3000 obtained by the condensation polymerization of an aliphatic diol with an aliphatic dibasic acid, whereby continuous pinhole-free coatings of polyvinylidene fluoride are obtained.

4. The process of claim 3 wherein the neutral ester is a condensation product of neopentyl glycol and adipic acid.

5. In the process of coating surfaces with polyvinylidene fluoride by the fluidized bed technique, the improvement which consists of dispersing in said polyvinylidene fluoride from about 10 to about 30 parts by weight per 100 parts of said polyvinylidene fluoride of a fusion aid, said fusion aid comprising (a) as a nonvolatile fusion aid, a neutral hydroxyl terminated polyester having a molecular weight between about 1000 and 3000 obtained by the condensation polymerization of an aliphatic diol with an aliphatic dibasic acid, and (b) as a volatile fusion aid, from about 5% to 95% by weight of the total fusion aid of a substance having a solvating effect on polyvinylidene fluoride and boiling at atmospheric pressure at 200° to 300° C.

6. The process of claim 5 wherein the nonvolatile fusion aid is a neutral ester obtained from the condensation polymerization of neopentyl glycol and adipic acid and the volatile fusion aid is dimethyl phthalate.

References Cited by the Examiner

UNITED STATES PATENTS

| | | | |
|---|---|---|---|
| 2,435,537 | 2/1948 | Ford et al. | 260—92.1 |
| 2,484,483 | 10/1949 | Berry | 260—31.8 |
| 2,520,173 | 8/1950 | Sanders | 260—31.8 |
| 2,581,453 | 1/1952 | Sprung | 260—31.8 |
| 2,719,093 | 9/1955 | Voris | 117—21 |
| 2,820,752 | 1/1958 | Heller | 117—132 |
| 2,844,489 | 7/1958 | Gemmer | 117—20 |
| 2,976,257 | 3/1961 | Dawe et al. | 117—132 |

FOREIGN PATENTS 588,833   6/1947   Great Britain.

OTHER REFERENCES

Hill, Allen, British Plastics, vol. 32, February 1959, pages 74–77 and 89.

MURRAY TILLMAN, *Primary Examiner.*

LEON J. BERCOVITZ, *Examiner.*